United States Patent [19]
Minamizawa

[11] Patent Number: 6,064,490
[45] Date of Patent: May 16, 2000

[54] PERIPHERAL MULTIFUNCTION DEVICE

[75] Inventor: Fumihiro Minamizawa, Toyoake, Japan

[73] Assignee: Brother Kogyo Kabushiki Kaisha, Nagoya, Japan

[21] Appl. No.: 08/916,255

[22] Filed: Aug. 22, 1997

[30] Foreign Application Priority Data

Aug. 26, 1996 [JP] Japan .................................. 8-223384

[51] Int. Cl.[7] .................................................. G06K 15/00
[52] U.S. Cl. ...................... 358/1.14; 358/1.15; 358/1.12; 358/404; 358/444
[58] Field of Search .................... 395/112–114; 358/468, 358/442, 404, 444, 1.15

[56] References Cited

U.S. PATENT DOCUMENTS 5,245,164  9/1993  Oyama ..................................... 235/379
5,720,014  2/1998  Ikeda et al. .............................. 395/114
5,764,866  6/1998  Maniwa .................................. 395/114

*Primary Examiner*—Mark R. Powell
*Assistant Examiner*—Lance W. Sealey
*Attorney, Agent, or Firm*—Oliff & Berridge, PLC

[57] ABSTRACT

A peripheral multifunction device includes a CPU performing data transmission and reception between the device and an information processing unit in a multiplex communication mode so that a plurality of functions of the device are performed and a storage unit for storing various data including the data received by the CPU. The CPU further judges a remaining capacity of the storage unit. A processing of storing in the storage unit the data concerning at least one of the functions of the peripheral multifunction device when the judged remaining capacity of the storage unit is at or below a predetermined value.

35 Claims, 3 Drawing Sheets

PERIPHERAL MULTIFUNCTION DEVICE

BACKGROUND OF THE INVENTION

1. Field of Invention

This invention relates to a peripheral multifunction device which can simultaneously execute a plurality of functions and which can serve in use as a peripheral device connected to information processing units such as personal computers.

2. Description of Related Art

Peripheral multifunction devices having a facsimile function, printer function and scanner function have recently been developed to serve as peripheral devices for information processing units such as personal computers. The peripheral multifunction device is constituted to be capable of simultaneously performing the three functions by multitasking. Each of the functions is accomplished in the peripheral multifunction device by transmitting and receiving to and from the information processing unit various data including printer data, scanner data, facsimile reception data and facsimile transmission data. Memories such as RAM or EEPROM need to be used for processing the various data. The above-described conventional peripheral multifunction device is provided with three memories dedicated to the three functions respectively so that the functions are simultaneously accomplished without interference with one another. However, since the three memories are provided for the respective functions, a capacity of each memory is increased and consequently, a production cost of the device is increased.

The inventor of the present application intended to reduce the capacity of each memory to a value as small as possible for the purpose of reducing the production cost. The inventor then designed a peripheral multifunction device in which a single memory was provided so as to be used commonly for the three functions and the capacity of the memory was reduced to a value as small as possible. The designed peripheral multifunction device has not been published yet.

The inventor has found several points to be improved in the designed constitution. More specifically, a large storage area is used in the peripheral multifunction device for the processing of a large quantity of compressed printer data when the printer data is transmitted from the information processing unit to the peripheral multifunction device, for example. The reason for this is that since a processing until the actual printing of the received printer data is slower than a processing of transmitting the printer data, the unprinted printer data tends to be successively accumulated in the memory. Accordingly, a remaining capacity of the memory is gradually reduced as additional printer data is transmitted. Further continued transmission of the printer data finally uses up the entire memory capacity, resulting in an system error. To prevent the memory from being full of stored data, the inventor constituted the peripheral multifunction device so that the data transmission and reception was inhibited between the information processing unit and the peripheral multifunction device by a hardware or software arrangement when the decrease in the memory remaining capacity to or below a predetermined value was detected.

In the above-described peripheral multifunction device, however, the data transmission and reception are completely inhibited between the information processing unit and the peripheral multifunction device when the memory remaining capacity has decreased to or below the predetermined value. Accordingly, the transmission and reception of facsimile data and scanner data each using a smaller memory capacity cannot be performed as well as that of the printer data using a larger memory capacity. In other words, a shortage in the memory remaining capacity interrupts the functions not resulting in full storage of the memory as well as the function resulting in full storage of the memory or printer function, namely, even the functions operable even when the remaining capacity of the memory becomes short are interrupted. Consequently, the efficiency in the use of the peripheral multifunction device is lowered, which results in a low usability of the device.

SUMMARY OF THE INVENTION

Therefore, an object of the present invention is to provide a peripheral multifunction device in which the capacity of the memory is reduced to a value as small as possible and all of a plurality of functions can be prevented from being interrupted by a shortage in the memory capacity.

In a first aspect of the present invention, a peripheral multifunction device comprises multitasking means for simultaneously executing a plurality of functions by multitasking, storage means for storing various data including data used for executing the plurality of functions, remaining capacity judging means for judging a remaining capacity of the storage means, and inhibition means for inhibiting a processing of storing in the storage means the data concerning at least one of the functions when the remaining capacity judging means has judged that the remaining capacity of the storage means is at or below a predetermined value.

According to the above-described peripheral multifunction device, the processing of storing in the storage means the data concerning the at least one of the plurality of functions is inhibited when it is judged that the remaining capacity of the storage means is at or below the predetermined value. The processing of storing in the storage means the data concerning the functions other than the at least one of the functions can be performed, namely, the functions other than the at least one of the functions are executable. Consequently, all of the plurality of functions can be prevented from being interrupted by a shortage in the memory capacity.

In a second aspect of the invention, the peripheral multifunction device preferably further comprises multiplexable transmission-reception means for transmitting and receiving the data for executing the plurality of functions to and from a data processor. In this peripheral multifunction device, data received by the transmission-reception means is stored in the storage means, and the inhibition means inhibits reception of the data concerning the at least one of the functions when the remaining capacity judging means has judged that the remaining capacity of the storage means is at or below the predetermined value. In this arrangement, too, only the processing of storing in the storage means the data concerning the at least one of the plurality of functions is inhibited when it is judged that the remaining capacity of the storage means is at or below the predetermined value.

Accordingly, the processing of storing in the storage means the data concerning the functions other than the specific one can be performed even if the remaining capacity of the memory becomes short. In the second aspect, furthermore, the data concerning the at least one of the functions, the reception of which is inhibited by the inhibition means, preferably has a marked tendency to be accumulated in the storage means.

The peripheral multifunction device in the second aspect preferably further comprises release means for releasing the inhibition of the reception of the data concerning the at least one of the functions when the remaining capacity judging means has judged that the remaining capacity of the storage means is above the predetermined value after the reception of the data concerning the at least one the functions has been inhibited by the inhibition means. In this arrangement, the processing of the data staying unprocessed in the storage means proceeds during the inhibition of data reception. The inhibited data reception is restarted when the remaining capacity of the memory is recovered above the predetermined value with progress of the staying data processing. Additionally, the inhibition of the reception of the data concerning the at least one of the functions is further preferably released when the remaining capacity of the storage means is above the predetermined value by a set value.

In the peripheral multifunction device of the second aspect, the plurality of functions preferably include a facsimile function, printer function and scanner function and the inhibition means preferably inhibits the processing of receiving the data concerning the printer function when the remaining capacity judging means has judged that the remaining capacity of the storage means is at or below the predetermined value. Reception of only the data concerning the printer function is inhibited when the remaining capacity of the storage means is reduced to or below the predetermined value. Consequently, the storage means can be prevented from being full of received printer data and accordingly, an occurrence of system error can be prevented. The other functions, even when performed, prevent the storage means from being full of data since each of the functions uses a small capacity of the storage means. The other functions include the facsimile transmission function from the information processing unit via the peripheral multifunction device, the facsimile reception function from another information processing unit via the peripheral multifunction device, and the scanner function. Furthermore, the reception of the data concerning the facsimile function is performed and the inhibition means inhibits the reception of the data concerning each of the other functions. Consequently, the facsimile function can be performed without delay.

In a third aspect of the invention, a storage medium for operating a peripheral multifunction device having multitasking means for simultaneously executing a plurality of functions by multitasking and storage means for storing various data including data used for executing the plurality of functions, comprises a remaining capacity judging program for judging a remaining capacity of the storage means, and an inhibition program for inhibiting a processing of storing in the storage means the data concerning at least one of the functions when the remaining capacity judging program has judged that the remaining capacity of the storage means is at or below a predetermined value.

BRIEF DESCRIPTION OF THE DRAWINGS

Other objects, features and advantages of the present invention will become clear upon reviewing the following description of a preferred embodiment thereof, made with reference to the accompanying drawings, in which.

DETAILED DESCRIPTION OF A PREFERRED EMBODIMENT

Figure 1:
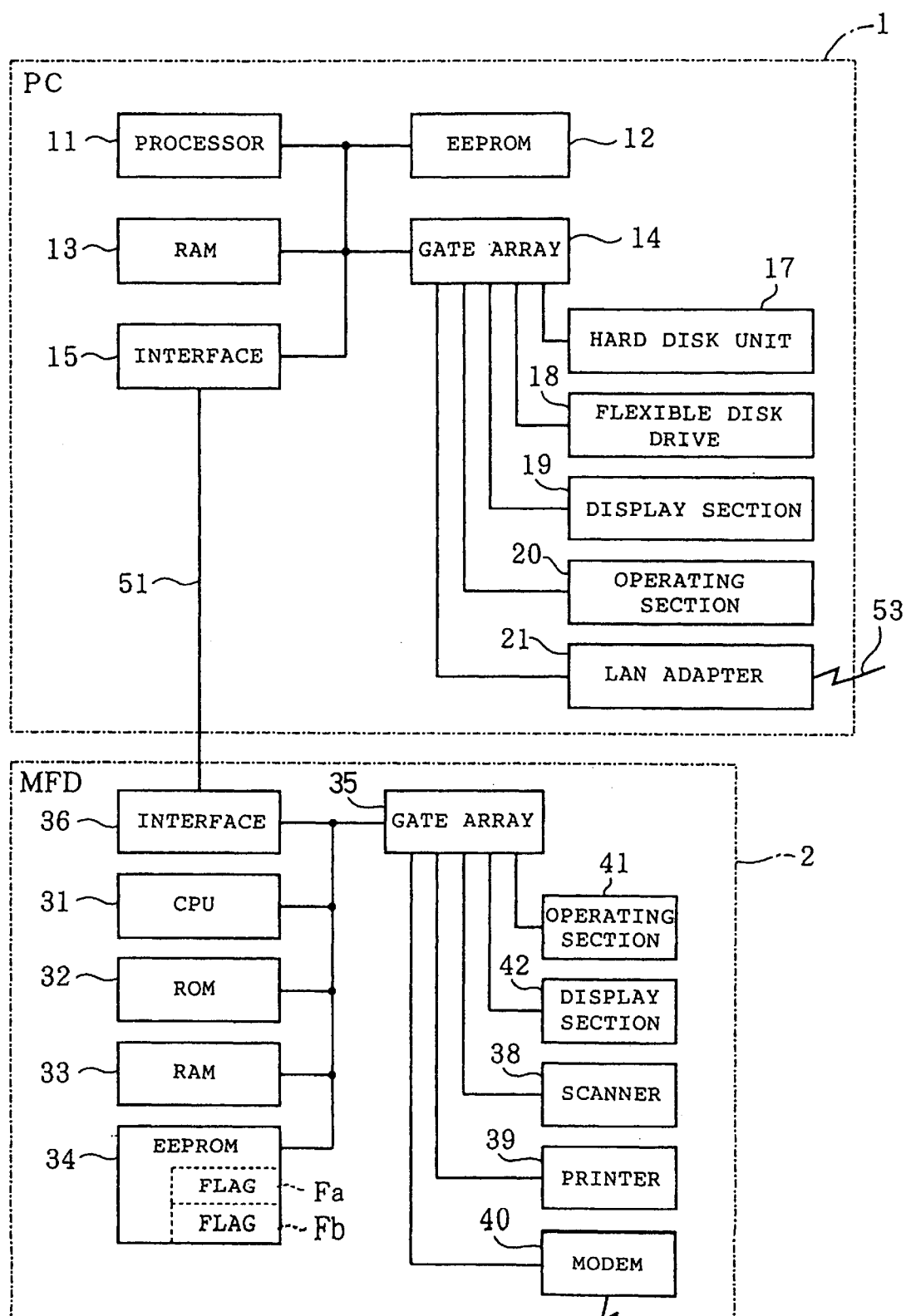
FIG. 1 is a block diagram showing the peripheral multifunction device of an embodiment in accordance with the present invention, the device being connected to a personal computer.

A preferred embodiment of the invention will be described with reference to the accompanying drawings. FIG. 1 is a block diagram showing circuits of a peripheral multifunction device 2 in accordance with the invention as being connected to a personal computer 1 (PC) which is an information processing unit. The personal computer 1 adopts a graphic user interface (GUI) using what is called multiwindow to permit multiple applications to be kept in operation simultaneously. The peripheral multifunction device 2 which will hereinafter be referred to as "MFD" has multiple functions such as the functions of a facsimile, printer, image scanner and copying machine.

The personal computer 1 is provided with a processor 11, EEPROM 12, RAM 13, gate array 14, interface (I/F) 15, hard disk unit 17, flexible disk drive 18, display section 19, operating section 20, and LAN adapter 21. The processor 11, EEPROM 12, RAM 13, gate array 14, and interface 15 are interconnected by a bus trunk. The bus trunk includes a data bus, address bus, and control signal line. The hard disk unit 17, flexible disk drive 18, display section 19, operating section 20, and LAN adapter 21 are connected to the gate array 14.

The processor 11 operates and performs information processing in accordance with programs installed in the hard disk unit 17 such as an operating system ("OS") and various application software programs. The EEPROM 12 stores cataloged data such as one-touch dialing and abbreviated dialing. RAM 13, which stores various data, is utilized by various application software programs. The gate array 14 functions as an interface between the processor 11 and the hard disk unit 17, flexible disk drive 18, display section 19, operating section 20, and LAN adapter 21. The interface 15 controls the transmission and reception of data between the personal computer 11 and MFD 2 in accordance with a standard such as "Centronics". The hard disk unit 17 stores various application software programs. The flexible disk drive 18 reads the contents of a flexible disk and writes data to the flexible disk. The display section 19 comprises LCD and is controlled by the processor 11 to display characters and graphics. The operating section 20 comprises a keyboard or mouse and delivers operation signals when operated by a user. The LAN adapter 21, which is connected to LAN 53, functions as an interface between the personal computer 1 and LAN 53.

MFD 2 is provided with CPU 31, ROM 32, RAM 33, EEPROM 34, gate array 35, interface 36, scanner 38, printer 39, modem 40, operating section 41, and display section 42. CPU 31, ROM 32, RAM 33, EEPROM 34, gate array 35, and interface 36 are interconnected by a bus trunk. The bus trunk includes a data bus, address bus, and control signal line. The scanner 38, printer 39, modem 40, operating section 41, and display section 42 are connected to the gate array 35. The interface 36 is connected to the interface 15 of the personal computer 1 through a cable 51. A telephone line 54 is connected to the modem 40.

The CPU 31 controls the whole of the MFD 2. The ROM 32 stores programs for controlling the MFD 2 etc. The RAM 33 stores various data. The EEPROM 34 stores cataloged data such as one-touch dialing and abbreviated dialing, as well as flags. The gate array 35 functions as an interface between the CPU 31 and the scanner 38, printer 39, modem 40, operating section 41, and display section 42. The interface 36 controls the transmission and reception of data between the personal computer 1 and MFD 2 in accordance with a standard such as "Centronics". The scanner 38 reads an original image and converts it into an image signal. The printer 39 prints the image on the basis of the image data. In the transmission and reception of data in facsimile communication, the modem 40 modulates a carrier wave in accordance with transmission data, demodulates a received carrier wave and takes out received data. The operating section 41, which comprises key switches, delivers an operation signal in accordance with an operation performed by the user. The display section 42 comprises LCD, for example and is controlled by the CPU 31 to display various information etc. for visual reading.

In the hard disk unit 17 of the personal computer 1 are installed MFD 2 controlling application software programs for realizing various functions such as facsimile communication between the personal computer 1 and another facsimile device, using the modem 40 of the MFD 2, printing of documents and images prepared by the personal computer 1, using the printer 39, and fetching of an image signal read by the scanner 38 into the personal computer 1. The MFD controlling application software programs are installed in the hard disk 17 by inserting a flexible disk into the flexible disk drive 18 and performing a predetermined operation. The application software programs comprise software called FAX driver which executes data conversion such as the conversion of text data into bit map data, software called log manager which manages and displays a communication history, and software called status monitor which manages the transmission and reception of data between the personal computer 1 and the MFD 2.

The CPU 31 of the MFD 2 operates and performs functions of transmission-reception means, remaining capacity judging means, and inhibition means in accordance with the programs stored in the ROM 32. The transmission-reception means is multiplexable and transmits to and receives from the personal computer 1 data for realizing a plurality of functions. The remaining capacity judging means judges a remaining capacity of the RAM 33. The inhibition means inhibits reception of data concerning a specific one of the plurality of functions when the judging means judges that the remaining capacity of the RAM 33 is at or below a predetermined value. The RAM 33 constitutes storage means for storing various data including the data received by the transmission-reception means.

The operation of the MFD 2 will now be described. The MFD 2 has the following first to third functions. The first function is a printer function of operating the printer 39 so that printer data delivered from the personal computer 1 through the cable 51 to the interface 36 is printed by the printer 39. The second function is a scanner function of operating the scanner 38 so that an original image is read and the image data is delivered to the personal computer 1. The third function is a PC facsimile function of operating the modem 40 so that facsimile transmission data is modulated and delivered to the telephone line 54, and demodulating facsimile reception data received via the telephone line 54 and supplying the demodulated data to the personal computer 1. The MFD 2 may have functions other than those described above. A plurality of functions of the MFD 2 which are not inconsistent with each other even when simultaneously operated are simultaneously operable by a time division processing. For example, the scanning or PC facsimile operation both of which do not use the printer 39 can be performed during the printing operation. More specifically, both the transmission of printer data from the personal computer 1 to the MFD 2 and the transmission of scanner data from the MFD 2 to the personal computer 1 or the transmission of facsimile data from the personal computer 1 to the MFD 2 can be performed by a multiplex communication system using a packet, for example. With this multiplex transmission, the CPU 31 of the MFD 2 can simultaneously perform both a printer task and a scanner task or facsimile task by multitasking.

Data originated by the personal computer 1 or the PC facsimile reception data stored in the hard disk unit 17 is transmitted as printer data from the personal computer 1 through the cable 51 to the MFD 2 so that the printer data is printed by the printer 39. In this case, the RAM 33 is used as a buffer memory for processing the printer data. The printer data is successively stored in the RAM 33 when a printer data processing speed of the printer 39 is lower than a speed of printer data input processing. Accordingly, a remaining capacity of the RAM 33 is gradually decreased. The printer data processing of the printer 39 includes printing the printer data and erasing the printed printer data from the RAM 33, for example, in the unit of page. The printer data input processing includes receiving the printer data from the personal computer 1 and storing it in the RAM 33.

The decrease in the remaining capacity of RAM 33 further proceeds when the volume of printer data is large. All the remaining capacity of the RAM 33 is used up when the input of printer data is continued. Accordingly, the input of printer data from the personal computer 1 needs to be inhibited when the remaining capacity of the RAM 33 is at or below a predetermined value.

On the other hand, a processing time in the MFD 2 is short with respect to scanner data transmitted from the MFD 2 to the personal computer 1 or PC facsimile data transmitted between the personal computer 1 and the MFD 2. In this case, the scanner or PC facsimile data is not accumulated in the RAM 33. Consequently, the scanner or PC facsimile function is operable even when the remaining capacity of the RAM 33 is at or below the predetermined value.

In view of the foregoing, when the remaining capacity of the RAM 33 is decreased to or below the predetermined value during data transmission between the personal computer 1 and the MFD 2 in the multiplex communication mode, reception of printer data from the personal computer 1 is inhibited in the MFD 2, whereas transmission and reception of the scanner data and PC facsimile data between the personal computer 1 and the MFD 2 is permitted. As the result of this arrangement, the scanner and PC facsimile function can operate even when the remaining capacity of the RAM 33 is at or below the predetermined value, and moreover, the volume of memory of the RAM 33 can be prevented from being used up.

In the MFD 2 of the embodiment, furthermore, data transmission and reception between the personal computer 1 and the MFD 2 is completely inhibited when the remaining capacity of the RAM 33 is at or below the predetermined value during data transmission between the personal computer 1 and the MFD 2 in a non-multiplex communication mode. In the non-multiplex communication mode, a plurality of separate data cannot simultaneously be transmitted nor received and only the reception of printer data cannot be interrupted with transmission and reception of the other data being permitted. Switching is automatically made between the processing in the multiplex communication and the processing in the non-multiplex communication mode in the MFD 2.

Figure 2:
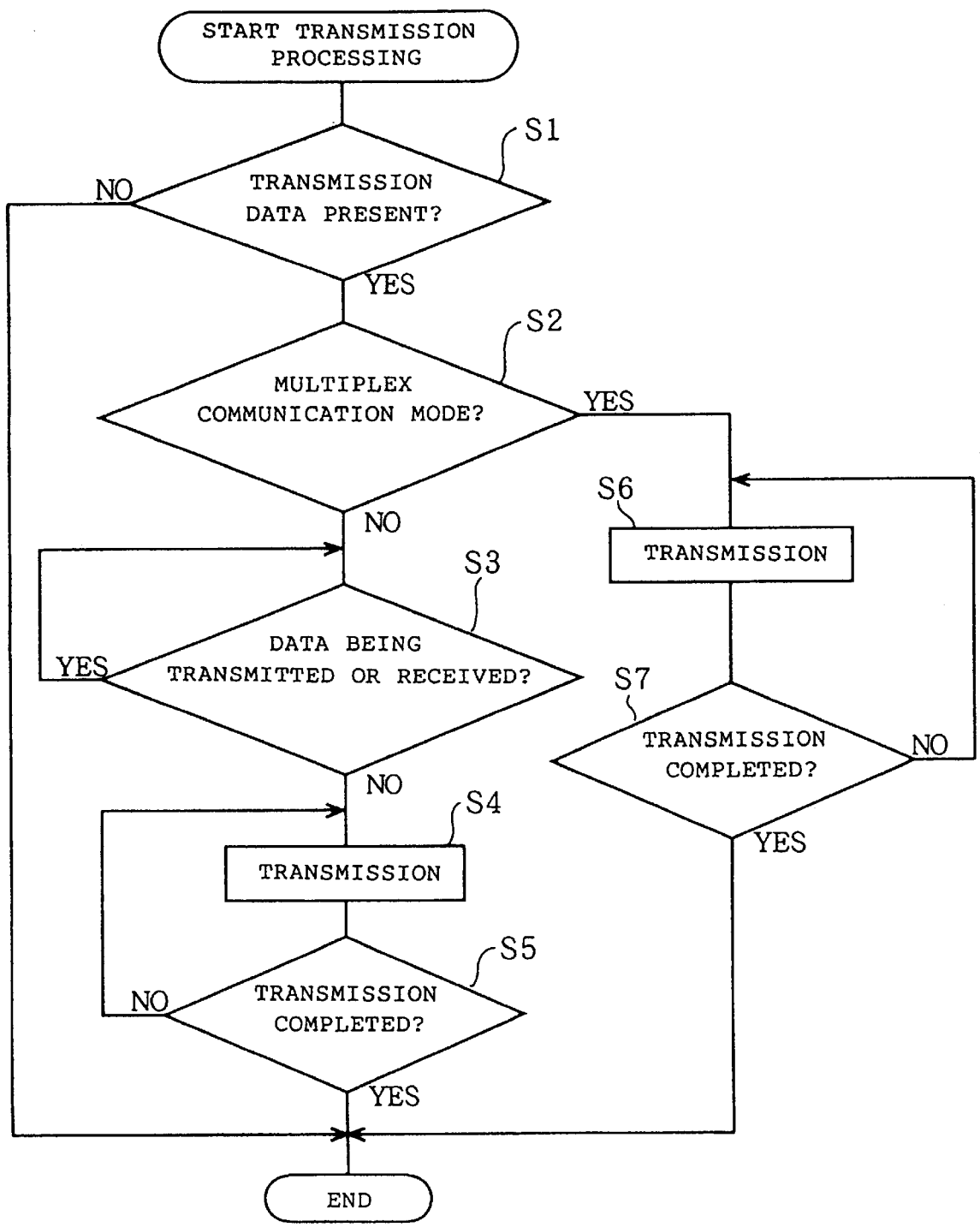
FIG. 2 is a flowchart showing the procedure for the processing of transmitting data from the peripheral multifunction device to the personal computer.

The procedures for data processing by the MFD 2 for realizing the above-described operation will now be described. First, the procedure of processing of transmitting data from the MFD 2 to the personal computer 1 will be described with reference to the flowchart of FIG. 2. The CPU 31 of MFD 2 judges at step S1 whether data to be transmitted to the personal computer 1 is present. For this purpose, check is made as to whether scanner data read by the scanner 38 or PC facsimile reception data delivered through the telephone line 54 into the modem 40 and demodulated is present. When judging that data to be transmitted to the personal computer 1 is present, the CPU 31 judges at step S2 whether the transmission through the cable 51 is in a multiplex communication mode. The data transmission between the personal computer 1 and the MFD 2 through the cable 51 has a multiplex communication mode with use of the packet and a non-multiplex communication mode. The data transmission is switchable between the two modes. The switching is performed at the personal computer 1 side. The MFD 2 examines in which mode the data transmission is. More specifically, a driver software for the multiplex communication needs to be started when the data transmission is switched to the multiplex communication mode. The personal computer 1 supplies a command through the cable 51 to the MFD 2 when the driver software is started or stopped, so that the MFD 2 switches a flag stored in the EEPROM 34 in accordance with the received command, thereby judging the data transmission mode on the basis of the flag.

The CPU 31 judges in the negative at step S2 when the data transmission is not in the multiplex communication mode. Since the data transmission is in the non-multiplex communication mode in this case and accordingly, a plurality of data cannot simultaneously be transmitted or received, the CPU 31 then judges at step S3 whether the data is being transmitted or received through the cable 51. The CPU 31 judges in the negative at step S3 when the data is not being transmitted or received through the cable 51. Since data can be transmitted in this case, the CPU 31 transmits data through the cable 51 to the personal computer 1 at step S4. The CPU 31 then judges whether data transmission has been completed at step S5. The CPU 31 judges in the affirmative at step S5 when the data transmission has been completed, thereby ending the routine. On the other hand, the CPU 31 judges in the negative at step S5 when the data transmission has not been completed, thereby returning to step S4 to continue data transmission. The CPU 31 judges in the affirmative at step S3 when the data transmission or reception is being performed through the cable 51, thereby standing by at step S3 for completion of the data transmission or reception.

The CPU 31 judges in the affirmative at step S2 when data transmission through the cable 51 is in the multiplex communication mode. In this case, even while data is being transmitted or received through the cable 51, another data can be transmitted. The CPU 31 then transmits data through the cable 51 at step S6. The CPU 31 then judges at step S7 whether the data transmission has been completed. The CPU 31 judges in the affirmative at step S7 when the data transmission has been completed, thereby ending the routine. The CPU 31 judges in the negative at step S7 when the data transmission has not been completed, thereby returning to step S6 to continue data transmission.

The CPU 31 judges in the negative at step S1 when no data to be transmitted to the personal computer 1 is present, thereby ending the routine. The above-described transmission processing is repeated at predetermined intervals so that presence or absence of data to be transmitted is continuously monitored.

Thus, data transmission from the MFD 2 to the personal computer 1 is unconditionally executed in the multiplex communication mode regardless of a remaining capacity of the RAM 33. When data transmission is in the non-multiplex communication mode, data is transmitted from the MFD 2 to the personal computer 1 provided that no other separate data is being transmitted or received.

Figure 3:
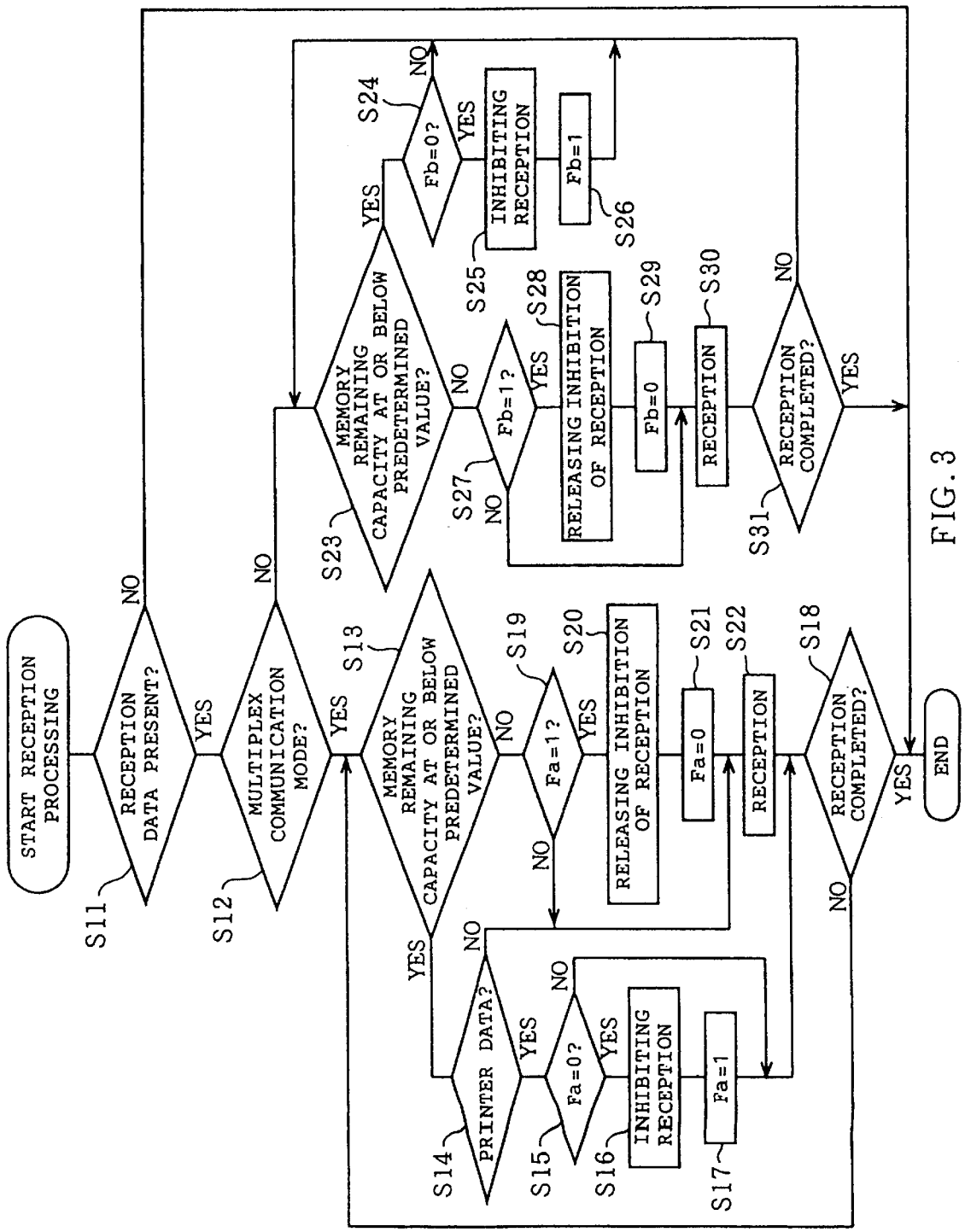
FIG. 3 is a flowchart showing the procedure for the processing of receiving data from the personal computer to the peripheral multifunction device.

The procedure for processing of the MFD 2 receiving data from the personal computer 1 will be described with reference to the flowchart of FIG. 3. First, the CPU 31 of the MFD 2 judges at step S11 whether any data transferred from the personal computer 1 to the MFD 2 (received data) is present. More specifically, the CPU 31 examines whether printer data or PC facsimile transmission data has been supplied from the personal computer 1 through the cable 51 and interface 36 to the RAM 33. The CPU 31 judges in the affirmative at step S11 when any received data is present, advancing to step S12 to judge whether the transmission through the cable 51 is in the multiplex communication mode. The CPU 31 judges in the affirmative at step S12 when the transmission is in the multiplex communication mode, thereby advancing to step S13 to judge whether the remaining capacity of the RAM 33 is at or below the predetermined value.

The CPU 31 judges in the affirmative at step S13 when the remaining capacity of the RAM 31 is at or below the predetermined value, thereby advancing to step S14 to judge whether the received data is printer data. Since the data transmission between the personal computer 1 and the MFD 2 is performed in the packet system, the CPU 31 examines whether the received data in the unit of packet is the printer data. The CPU 31 judges in the affirmative at step S14 when the received data is the printer data, advancing to step S15 to judge whether a flag Fa stored in the EEPROM 34 is 0. The flag Fa represents whether the command for inhibiting reception of printer data has been delivered to the personal computer 1 when the remaining capacity of the RAM 33 is at or below the predetermined value. The command has not been delivered to the personal computer 1 when the flag Fa is 0, whereas it has been delivered when the flag Fa is 1.

The CPU 31 judges in the affirmative at step S15 when the flag Fa stored in the EEPROM 34 is 0. Since the command has not been delivered in this case, the CPU 31 transmits the command for inhibiting the reception of printer data through the cable 51 to the personal computer 1, at stop S16. Consequently, the personal computer 1 interrupts transmission of the printer data to the MFD 2. The CPU 31 then sets the flag Fa to 1 at step S17 and judges at step S18 whether the reception processing has been terminated. Upon termination of the reception processing, the CPU 31 judges in the affirmative at step S18, thereby ending the routine. The CPU 31 judges in the negative at step S18 when the reception processing has not been terminated, thereby returning to step S13 so that the judgment on the remaining capacity of RAM 33 and the subsequent judgments are performed.

The CPU 31 judges in the negative at step S15 when the flag Fa is not 0. Since the command for inhibiting reception of printer data has been transmitted to the personal computer 1 in this case, the CPU 31 advances to step S18 so that the judgment on the termination of reception processing and the subsequent judgments are performed.

The CPU 31 judges in the negative when at step S13 when the remaining capacity of the RAM 33 is not at or below the predetermined value. The CPU 31 then judges at step S19 whether the flag Fa is set to 1. When the flag Fa is 1, the CPU judges in the affirmative. Since the command for inhibiting reception of printer data has been transmitted to the personal computer 1 in this case, the CPU 31 transmits another command for releasing the personal computer 1 from the inhibition of reception of printer data through the cable 51 to the personal computer 1 at step S20. The reason for the above-described release of the personal computer 1 from the inhibition of reception of printer data is that the printer data can be re-received since the remaining capacity of the RAM 33 has exceeded the predetermined value with progress in the processing of the printer data.

The CPU 31 successively sets the flag Fa to 0 at step S21 and processes the received data transmitted from the personal computer 1 at step S22. The processing at step S22 includes a processing (data reception processing) for converting the received data from the personal computer 1 to data format in the case where the received data is actually processed, for example. The CPU 31 then advances to step S18 to continue the judgment on the termination of reception processing and the subsequent processing.

The CPU 31 judges in the negative at step S19 when the flag Fa is not 1. Since the command for inhibiting reception of printer data has not been transmitted to the personal computer 1 in this case, the CPU 31 advances to step S22 to continue the processing of receiving data from the personal computer 1 and the subsequent steps.

The CPU 31 judges in the negative at step S12 when the data transmission through the cable 51 is not in the multiplex communication mode. Since the data transmission is in the non-multiplex communication mode, the CPU 31 judges at step S23 whether the remaining capacity of the RAM 33 is at or below the predetermined value. When the remaining capacity of the RAM 33 is at or below the predetermined value, the CPU 31 judges in the affirmative at step S23, advancing to step S24 to judge whether a flag Fb stored in the EEPROM 34 is 0. The flag Fb represents permission or inhibition of reception of data from the personal computer 1 through the cable 51 when the remaining capacity of the RAM 33 is at or below the predetermined value in the non-multiplex communication mode. The data reception is permitted when the flag Fb is 0, whereas it is inhibited when the flag Fb is 1.

The CPU 31 judges in the affirmative at step S24 when the flag Fb stored in the EEPROM 34 is 0. Since the reception is not inhibited, the CPU 31 inhibits the reception of data from the personal computer 1 at step S25. More specifically, the transmission and reception of data through the cable 51 are entirely inhibited by a software or hardware arrangement. The remaining capacity of the RAM 33 is decreased to or below the predetermined value only while the printer data is being received from the personal computer 1 if the MFD 2 is in normal operation. In the above-described case, accordingly, the reception of printer data from the personal computer 1 is substantially inhibited. As a result, the personal computer 1 interrupts the transmission of data to the MFD 2. The CPU 31 sets the flag Fb to 1 at step S26, returning to step S23 to continue the judgment on remaining capacity of the RAM 33 and the subsequent processing.

The CPU 31 judges in the negative at step S24 when the flag Fb is not 0. Since the reception of data from the personal computer 1 has already been inhibited in this case, the CPU 31 returns to step S23 to continue the judgment on remaining capacity of the RAM 33 and the subsequent processing.

The CPU 31 judges in the negative at step S23 when the remaining capacity of the RAM 33 is not at or below the predetermined value. The CPU 31 then judges at step S27 whether the flag Fb is 1. The CPU 31 judges in the affirmative at step S27 when the flag Fb is 1. Since the reception of data from the personal computer 1 has been inhibited, the CPU 31 advances to step S28 to release the RAM 33 from the inhibition of reception of data from the personal computer 1. In this case, since the remaining capacity of the RAM 33 has exceeded the predetermined value with progress in the printer data processing, the reception of data from the personal computer 1 is restarted.

The CPU 31 then sets the flag Fb to 0 at step S29 and processes the data received from the personal computer 1 at step S30. The processing at step S30 includes a processing (data reception processing) for converting the data received from the personal computer 1 to data format in the case where the received data is actually processed, for example. The CPU 31 then advances to step S31 to judge whether the data reception has ended. When the data reception has ended, the CPU 31 judges in the affirmative at step S31, thereby terminating the routine. When the data reception has not ended, the CPU 31 judges in the negative at step S31, returning to step S23 to continue the judgment of remaining capacity of the RAM 33 and the subsequent processing.

The CPU 31 judges in the negative at step S27 when the flag Fb is not 1. Since the reception of data from the personal computer 1 has been is not inhibited in this case, the CPU 31 advances to step S30 to continue the processing of receiving the data from the personal computer 1 and the subsequent processing.

The CPU 31 judges in the negative at step S11 when no data received from the personal computer 1 is present. Since the processing of receiving data need not be executed in this case, the CPU 31 terminates this routine. The processing of receiving data is performed at predetermined intervals so that the presence or absence of the data received from the personal computer 1 is continuously monitored.

The reception of data from the personal computer 1 is thus inhibited in the multiplex communication mode when the printer data has decreased the remaining capacity of the RAM 33 to or below the predetermined value. The reception of the other data from the personal computer 1 is not inhibited in this case. Furthermore, the reception of data from the personal computer 1 is inhibited in the non-multiplex communication mode when the remaining capacity of the RAM 33 has decreased to or below the predetermined value. The remaining capacity of the RAM 33 decreases to or below the predetermined value only while the printer data is being received if the MFD 2 is in a normal operation. Accordingly, only the reception of printer data is substantially inhibited.

In the foregoing embodiment, the inhibition of reception of printer data is released when the remaining capacity of the RAM 33 exceeds the predetermined value after having been decreased to or below the predetermined value. However, the inhibition of reception of printer data may be released when the remaining capacity of the RAM 33 is increased by a set value over the predetermined value after having been decreased to or below the predetermined value, instead. Consequently, a frequent repeat of the inhibition of printer data reception and the release of inhibition can be prevented.

Furthermore, when the remaining capacity of the RAM 33 has decreased to or below the predetermined value, only the processing of storing the data concerning the facsimile transmission and reception function in the RAM 33 may preferentially be performed and the processing of storing the data concerning the other functions in the RAM 33 may be inhibited or interrupted. In this case, the preferential processing of storing the data concerning the facsimile transmission and reception function in the RAM 33 is preferably interrupted and the inhibition of processing of storing the data concerning the other function (copying function) in the memory is preferably released when the remaining capacity of the RAM 33 is increased over the predetermined value or by a set value over the predetermined value.

The MFD 2 is connected to the personal computer 1 serving as the information processing unit in the foregoing embodiment. However, the MFD 2 may be connected to work station computers or other computers. Furthermore, the MFD 2 has the functions of a printer, image scanner, PC facsimile transmission and reception, etc. in the foregoing embodiment. However, the functions of the peripheral multifunction device serving as a peripheral device for information processing units should not be limited to those described above. Additionally, the multiplex communication performed by the transmission-reception means may be a time-division multiplex communication system, frequency-division multiplex or packet system.

Although the RAM 33 is used as storage means in the foregoing embodiment, another storage unit such as EEPROM or a hard disk unit may be used as the storage means, instead. Furthermore, the printer data serves as the data concerning the specific function and the reception of which is inhibited by the inhibition means. Other data tending to be successively accumulated in the RAM 33 may be selected as the data concerning the specific function and the reception of which is inhibited by the inhibition means, instead.

The CPU 31 operates and performs the functions of transmission-reception means, remaining capacity judging means, and inhibition means in accordance with the programs stored in the ROM 32 in the foregoing embodiment. The MFD may be provided with electronic circuits composed of hardware arrangement such as gate circuits and accomplishing the respective functions of the transmission-reception means, remaining capacity judging means and inhibition means or more specifically, a transmission-reception circuit, remaining capacity judging circuit and inhibition circuit.

Furthermore, the programs for accomplishing the transmission-reception means, remaining capacity judging means, and inhibition means are stored in the ROM 32 in the foregoing embodiment. For example, the MFD may be provided with a hard disk unit in which the programs are stored, and a floppy disk drive, instead. In this case, the programs are preferably stored in the floppy disk and the floppy disk is preferably set in the floppy disk drive so that the programs are installed in the hard disk of the MFD. Furthermore, the programs may be stored in a CD-ROM and the MFD may be provided with a CD-ROM drive so that the programs are installed via the CD-ROM in the MFD. A storage medium for storing the programs should not be limited to the above-described floppy disk and CD-ROM. An IC card or magnetic card may be used for the purpose. Additionally, the programs stored in a storage medium such as floppy disk may be transmitted from the personal computer side through a cable to the MFD so that the programs are installed in the MFD.

Although the peripheral multifunction device of the present invention is applied to the MFD 2 connected to the personal computer 1 in the foregoing embodiment, it may be applied to a separately used MFD, instead. The separately used MFD may have a function of facsimile transmission and reception, and a copying function. Assume now the case where the copying function is operated to copy a large volume of document amounting, for example, to several hundred pages while the facsimile transmission and reception function is in operation. A memory of the MFD such as RAM would become full of stored data as image data obtained by scanning the document to be copied is successively stored in the memory, resulting in occurrence of system error. In view of this problem, it can be suggested that both the copying function and the facsimile transmission and reception function be interrupted when the remaining capacity of the memory has decreased to or below the predetermined value. In such an arrangement, however, the facsimile transmission and reception would take much time or fail.

On the other hand, the MFD, when the present invention is applied thereto, can be constituted, in application of the present invention, so that the processing of storing the data concerning the copying function (corresponding to the specific function) is inhibited and the processing of storing the data concerning the facsimile transmission and reception function corresponding to the other function is continuously executed without inhibition. Consequently, the memory can be prevented from becoming full of stored data, and the facsimile transmission and reception can be performed promptly and normally. The MFD can be constituted so that the inhibition of processing of storing the data concerning the copying function in the memory is released so that the processing is restarted when the remaining capacity of the memory has recovered to or above the predetermined value or to a value larger by the set value over the predetermined value.

Further, in all of the foregoing embodiments, if the MFD has the facsimile function and other two or more functions, not only specific one of functions but also other one or more functions except the facsimile function may be inhibited when the remaining capacity of the memory has decreased to or below the predetermined value.

The foregoing description and drawings are merely illustrative of the principles of the present invention and are not to be construed in a limiting sense. Various changes and modifications will become apparent to those of ordinary skill in the art. All such changes and modifications are seen to fall within the true spirit and scope of the invention as defined by the appended claims.

I claim:

1. A peripheral multifunction device comprising:
   multitasking means for simultaneously executing a plurality of functions by multitasking;
   storage means for storing various data including data used for executing the plurality of functions;
   remaining capacity judging means for judging a remaining capacity of the storage means; and
   inhibition means for inhibiting a processing of storing in the storage means the data concerning at least one of the functions, based on whether the data is printer data, scanner data or facsimile data, when the remaining capacity judging means has judged that the remaining capacity of the storage means is at or below a predetermined value.

2. A peripheral multifunction device according to claim 1, further comprising multiplexable transmission-reception means for transmitting and receiving the data for executing the plurality of functions to and from a data processor, wherein data received by the transmission-reception means is stored in the storage means, and wherein the inhibition means inhibits reception of the data received by the multiplexable transmission-reception means and concerning the at least one of the functions, based on the type of the data, when the remaining capacity judging means has judged that the remaining capacity of the storage means is at or below the predetermined value.

3. A peripheral multifunction device according to claim 2, wherein regarding the data concerning the at least one of the functions, the reception of which is inhibited by the inhibition means, a speed at which the data is accumulated in the storage means is larger than a speed at which the data is read from the storage means and a corresponding processing of the data is performed.

4. A peripheral multifunction device according to claim 2, further comprising release means for releasing the inhibition of the reception of the data concerning the at least one of the functions when the remaining capacity judging means has judged that the remaining capacity of the storage means is above the predetermined value after the reception of the data concerning the at least one of the functions has been inhibited by the inhibition means.

5. A peripheral multifunction device according to claim 4, wherein the release means releases the inhibition of the reception of the data concerning the at least one of the functions when the remaining capacity judging means has judged that the remaining capacity of the storage means is above the predetermined value by a set value after the reception of the data concerning the at least one of the functions has been inhibited by the inhibition means.

6. A peripheral multifunction device according to claim 2, wherein the plurality of functions include a printer function and at least one of a scanner functions and a facsimile function, and the inhibition means inhibits the reception of the data concerning the printer function, based on the of the data, when the remaining capacity judging means has judged that the remaining capacity of the storage means is at or below the predetermined value.

7. A peripheral multifunction device according to claim 2, wherein the plurality of functions include a facsimile function and at least either one of a printer functions and a scanner function, and the reception of the data concerning the facsimile function is performed and the inhibition means inhibits the reception of the data concerning each of the functions other than the facsimile function, based on the type of the data, when the remaining capacity judging means has judged that the remaining capacity of the storage means is at or below the predetermined value.

8. A peripheral multifunction device according to claim 7, further comprising release means for releasing the inhibition of the reception of each of the data concerning the functions other than the facsimile function when the remaining capacity judging means has judged that the remaining capacity of the storage means is above the predetermined value after the reception of each of the data concerning the functions other than the facsimile function has been inhibited by the inhibition means.

9. A peripheral multifunction device according to claim 8, wherein the release means releases the inhibition of the reception of each of the data concerning the functions other than the facsimile function when the remaining capacity judging means has judged that the remaining capacity of the storage means is above the predetermined value by a set value after the reception of each of the data concerning the functions other than the facsimile function has been inhibited by the inhibition means.

10. A peripheral multifunction device according to claim 1, wherein the plurality of functions include a facsimile function and copying function, and wherein the inhibition means inhibits a processing of storing data concerning the copying function in the storage means, based on the type of the data, when the remaining capacity judging means has judged that the remaining capacity of the storage means is at or below the predetermined value.

11. A peripheral multifunction device according to claim 10, further comprising release means for releasing the inhibition of the processing of storing data concerning the copying function when the remaining capacity judging means has judged that the remaining capacity of the storage means is above the predetermined value after the processing of storing data concerning the copying function has been inhibited by the inhibition means.

12. A peripheral multifunction device according to claim 11, further comprising release means for releasing the inhibition of the processing of storing data concerning the copying function when the remaining capacity judging means has judged that the remaining capacity of the storage means is above the predetermined value by a set value after the processing of storing data concerning the copying function has been inhibited by the inhibition means.

13. A peripheral multifunction device to claim 10, wherein the inhibition means inhibits the processing of storing the data concerning each of the functions other than the facsimile function, based on the type of the data, when the remaining capacity judging means has judged that the remaining capacity of the storage means is at or below the predetermined value.

14. A peripheral multifunction device according to claim 13, further comprising release means for releasing the inhibition of the processing of storing data concerning each of the functions other than the facsimile function when the remaining capacity judging means has judged that the remaining capacity of the storage means is above the predetermined value after the processing of storing data concerning each of the functions other than the facsimile function has been inhibited by the inhibition means.

15. A peripheral multifunction device according to claim 14, wherein the release means releases the inhibition of the processing of storing data concerning each of the functions other than the facsimile function when the remaining capacity judging means has judged that the remaining capacity of the storage means is above the predetermined value by a set value after the processing of storing data concerning each of the functions other than the facsimile function has been inhibited by the inhibition means.

16. A peripheral multifunction device comprising:

a circuit for simultaneously executing a plurality of functions by multitasking;

a memory for storing various data including data for executing the plurality of functions;

a remaining capacity judging circuit for judging a remaining capacity of the memory; and an inhibition circuit for inhibiting a processing of storing in the memory the data concerning at least one of the functions, based on whether the data is printer data, scanner data or facsimile data, when the remaining capacity judging circuit has judged that the remaining capacity of the memory is at or below a predetermined value.

17. A storage medium storing a program for operating a peripheral multifunction device having multitasking means for simultaneously executing a plurality of functions by multitasking and storage means for storing various data including data used for executing the plurality of functions, the program accomplishing the functions of:

judging a remaining capacity of the storage means; and inhibiting a processing of storing in the storage means the data concerning at least one of the functions, based on whether the data is printer data, scanner data or facsimile data, when the remaining capacity judging program has judged that the remaining capacity of the storage means is at or below a predetermined value.

18. A storage medium according to claim 17, wherein the program further accomplishes the function of storing, in the storage means, data used for executing the plurality of functions, transmitted from a data processor connected to the peripheral multifunction device, and wherein the inhibition program inhibits reception of the data used for executing the plurality of functions, based on the type of the data, when the remaining capacity judging program has judged that the remaining capacity of the storage means is at or below the predetermined value.

19. A storage medium according to claim 17, wherein the plurality of functions include a facsimile function and a copying function, and wherein the inhibition program inhibits a processing of storing data concerning the copying function in the storage means, based on the type of the data, when the remaining capacity judging program has judged that the remaining capacity of the storage means is at or below the predetermined value.

20. A storage medium according to claim 17, further comprising a releasing program for releasing the inhibition by the inhibition program when the remaining capacity judging program has judged that the remaining capacity of the storage means is above the predetermined value.

21. A peripheral multifunction device comprising:
multitasking means for simultaneously executing a plurality of functions by multitasking;
storage means for storing various data including data used for executing the plurality of functions;
remaining capacity judging means for judging a remaining capacity of the storage means; and
inhibition means for inhibiting a processing of storing in the storage means the data concerning a predetermined one or more of the functions and permitting a processing of storing in the storage means the data concerning each of the other function or functions when the remaining capacity judging means has judged that the remaining capacity of the storage means is at or below a predetermined value.

22. A peripheral multifunction device according to claim 21, further comprising multiplexable transmission-reception means for transmitting and receiving the data for executing the plurality of functions to and from a data processor, wherein data received by the transmission-reception means is stored in the storage means, and wherein the inhibition means inhibits reception of the data received by the multiplexable transmission-reception means and concerning the predetermined one or more of the functions when the remaining capacity judging means has judged that the remaining capacity of the storage means is at or below the predetermined value.

23. A peripheral multifunction device according to claim 22, wherein regarding the data concerning the predetermined one or more of the functions, the reception of which is inhibited by the inhibition means, a speed at which the data is accumulated in the storage means is larger than a speed at which the data is read from the storage means and a corresponding processing of the data is performed.

24. A peripheral multifunction device according to claim 22, further comprising release means for releasing the inhibition of the reception of the data concerning the predetermined one or more of the functions when the remaining capacity judging means has judged that the remaining capacity of the storage means is above the predetermined value after the reception of the data concerning the predetermined one or more of the functions have been inhibited by the inhibition means.

25. A peripheral multifunction device according to claim 24, wherein the release means releases the inhibition of the reception of the data concerning the predetermined one or more of the functions when the remaining capacity judging means has judged that the remaining capacity of the storage means is above the predetermined value by a set value after he reception of the data concerning the predetermined one or more of the functions have been inhibited by the inhibition means.

26. A peripheral multifunction device according to claim 22, wherein the plurality of functions include a printer function, and at least either one of a scanner function and a facsimile function, and the inhibition means inhibits the reception of the data concerning the printer function when the remaining capacity judging means has judged that the remaining capacity of the storage means is at or below the predetermined value.

27. A peripheral multifunction device according to claim 22, wherein the plurality of functions include a facsimile function and at least either one of a printer function and a scanner function, and the reception of the data concerning the facsimile function is performed and the inhibition means inhibits the reception of the data concerning each of the functions other than the facsimile function when the remaining capacity judging means has judged that the remaining capacity of the storage means is at or below the predetermined value.

28. A peripheral multifunction device according to claim 27, further comprising release means for releasing the inhibition of the reception of each of the data concerning the functions other than the facsimile function when the remaining capacity judging means has judged that the remaining capacity of the storage means is above the predetermined value after the reception of each of the data concerning the functions other than the facsimile function has been inhibited by the inhibition means.

29. A peripheral multifunction device according to claim 28, wherein the release means releases the inhibition of the reception of each of the data concerning the functions other than the facsimile function when the remaining capacity judging means has judged that the remaining capacity of the storage means is above the predetermined value by a set value after the reception of each of the data concerning the functions other than the facsimile function has been inhibited by the inhibition means.

30. A peripheral multifunction device according to claim 21, wherein the plurality of functions include a facsimile function and a copying function, and wherein the inhibition means inhibits a processing of storing data concerning the copying function in the storage means when the remaining capacity judging means has judged that the remaining capacity of the storage means is at or below the predetermined value.

31. A peripheral multifunction device according to claim 30, further comprising release means for releasing the inhibition of the processing of storing data concerning the copying function when the remaining capacity judging means has judged that the remaining capacity of the storage means is above the predetermined value after the processing of storing data concerning the copying function has been inhibited by the inhibition means.

32. A peripheral multifunction device according to claim 31, wherein the release means releases the inhibition of the processing of storing data concerning the copying function when the remaining capacity judging means has judged that the remaining capacity of the storage means is above the predetermined value by a set value after the processing of storing data concerning the copying function has been inhibited by the inhibition means.

33. A peripheral multifunction device according to claim 30, wherein the inhibition means inhibits the processing of storing the data concerning each of the functions other than the facsimile function when the remaining capacity judging means has judged that the remaining capacity of the storage means is at or below the predetermined value.

34. A peripheral multifunction device according to claim 33, further comprising release means for releasing the inhibition of the processing of storing data concerning each of the functions other than the facsimile function when the remaining capacity judging means has judged that the remaining capacity of the storage means is above the predetermined value after the processing of storing data concerning each of the functions other than the facsimile function has been inhibited by the inhibition means.

35. A peripheral multifunction device according to claim 34, wherein the release means releases the inhibition of the processing of storing data concerning each of the functions other than the facsimile function when the remaining capacity judging means has judged that the remaining capacity of the storage means is above the predetermined value by a set value after the processing of storing data concerning each of the functions other than the facsimile function has been inhibited by the inhibition means.

* * * * *